United States Patent
Jin et al.

(10) Patent No.: US 8,849,549 B2
(45) Date of Patent: Sep. 30, 2014

(54) METHOD OF CONTROLLING COMBUSTION OF DIESEL ENGINE

(75) Inventors: Jaemin Jin, Hwaseong-si (KR); Kootae Kang, Hwaseong-si (KR); Insoo Jung, Suwon-si (KR); Seungeun Yu, Seoul (KR); Young Gwan Kim, Chungbuk (KR); Jin Woo Lee, Yongin-si (KR)

(73) Assignees: Hyundai Motor Company, Seoul (KR); Ajou University Industry-Academic Cooperation Foundation, Suwon-Si (KR)

( * ) Notice: Subject to any disclaimer, the term of this patent is extended or adjusted under 35 U.S.C. 154(b) by 147 days.

(21) Appl. No.: 13/542,503

(22) Filed: Jul. 5, 2012

(65) Prior Publication Data

US 2013/0151122 A1    Jun. 13, 2013

(30) Foreign Application Priority Data

Dec. 13, 2011 (KR) .......................... 10-2011-0133722

(51) Int. Cl.
*F02D 35/02* (2006.01)
*G01M 15/12* (2006.01)

(52) U.S. Cl.
CPC ............. *F02D 35/028* (2013.01); *G01M 15/12* (2013.01)
USPC ....................................................... 701/111

(58) Field of Classification Search
CPC .............................. G01M 15/12; F02D 35/027
USPC .......................................... 701/104, 105, 111
See application file for complete search history.

(56) References Cited

U.S. PATENT DOCUMENTS

| | | | | |
|---|---|---|---|---|
| 4,347,820 A | * | 9/1982 | Deleris | 123/406.36 |
| 4,543,934 A | * | 10/1985 | Morita et al. | 123/435 |
| 6,546,328 B1 | * | 4/2003 | Slicker | 701/111 |
| 7,444,231 B2 | * | 10/2008 | Ancimer et al. | 701/111 |
| 7,653,477 B2 | * | 1/2010 | Yoshihara et al. | 701/111 |
| 8,033,165 B2 | * | 10/2011 | Kim et al. | 73/114.26 |
| 2006/0136117 A1 | * | 6/2006 | Kaneko et al. | 701/111 |

FOREIGN PATENT DOCUMENTS

| | | |
|---|---|---|
| JP | 7-151598 A | 6/1995 |
| JP | 2003-3883 A | 1/2003 |

(Continued)

*Primary Examiner* — Stephen K Cronin
*Assistant Examiner* — Robert Werner
(74) *Attorney, Agent, or Firm* — Morgan, Lewis & Bockius LLP

(57) ABSTRACT

A method of controlling combustion of a diesel engine may include a vibration measuring step of measuring engine vibrations, a measurement region setting step of setting a range where an LPP (location of peak pressure) is predicted from measured vibration data, a frequency transforming step of transforming a vibration signal to a frequency response function, a frequency integrating step of integrating the transformed frequency response function, an LPP detecting step of selecting a location of peak pressure from integrated frequency response function, an estimated value determining step of selecting LPP offset and SOC (start of combustion) offset by using the detected LPP, an error determining step of determining LPP value error and SOC value error by comparing the estimated LPP value and the estimated SOC value with a target LPP value and a target SOC value, and a combustion correcting step of correcting and controlling combustion by the determined errors.

6 Claims, 11 Drawing Sheets

(56) References Cited

FOREIGN PATENT DOCUMENTS

| | | |
|---|---|---|
| JP | 2010-203341 A | 9/2010 |
| JP | 2010-209873 A | 9/2010 |
| KR | 1999-0088453 A | 12/1999 |
| KR | 2003-0050770 A | 6/2003 |
| KR | 10-2004-0025552 A | 3/2004 |
| KR | 10-2005-0032740 A | 4/2005 |
| KR | 10-2010-0060724 A | 6/2010 |
| KR | 10-2010-0063561 A | 6/2010 |

* cited by examiner

FIG.1 (Related-Art)

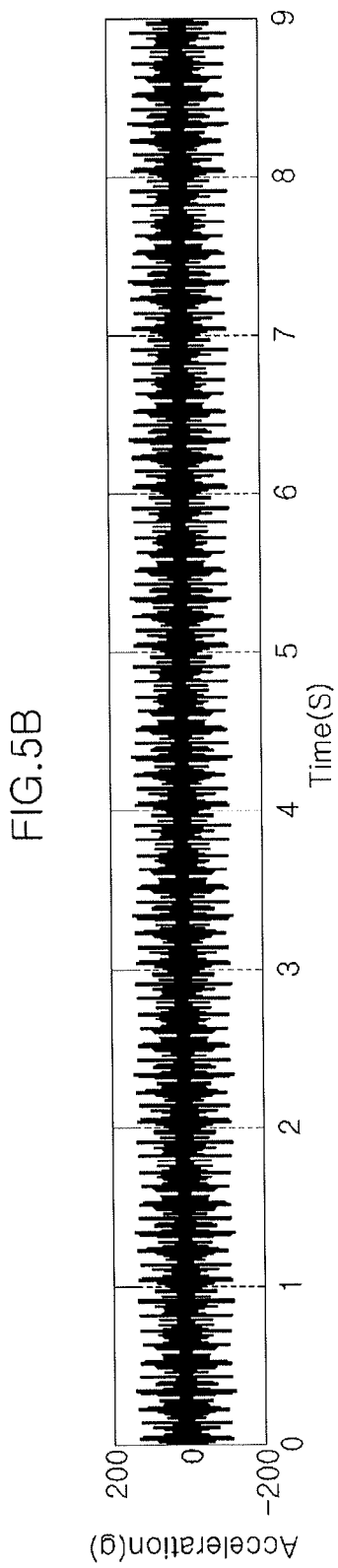

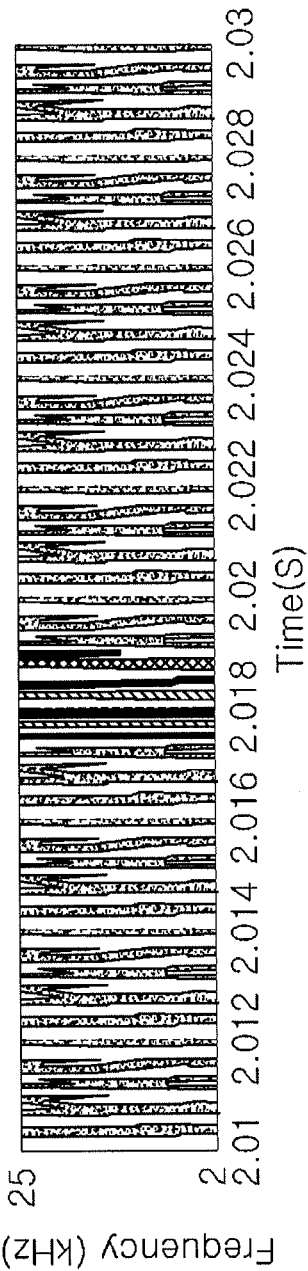

METHOD OF CONTROLLING COMBUSTION OF DIESEL ENGINE

CROSS-REFERENCE TO RELATED APPLICATIONS

The present application claims priority to Korean Patent Application Number 10-2011-0133722 filed Dec. 13, 2011, the entire contents of which application is incorporated herein for all purposes by this reference.

BACKGROUND OF THE INVENTION

1. Field of the Invention

The present invention relates to a method of controlling combustion of a diesel engine, and more particularly, to a method of controlling combustion of a diesel engine where a fuel injection timing is controlled not by directly measuring a combustion pressure but by estimating a maximum pressure of a combustion chamber through vibrations.

2. Description of Related Art

In the related art, pressure in a cylinder of a diesel engine has been directly measured for controlling combustion of the diesel engine so that the measured pressure of the cylinder has been used in controlling combustion of the diesel engine.

For example, according to a combustion control method according to the related art, a pressure sensor is directly mounted within a cylinder and an engine RPM sensor, an engine load sensor, and a crack angle sensor are mounted to the engine, and an engine is controlled by using a cylinder pressure, an engine RPM, an engine load, and a crank angle measured by the sensors as shown in FIG. 1.

That is, as shown in FIG. 2, if an operation of an engine is started (S210), a combustion pressure of a combustion chamber is measured depending on a crank angle (S220), a crank angle corresponding to an MFB (mass fraction burning) 50 is measured by using the measured pressure of the cylinder (S230), a point corresponding to the MFB 50 is measured as the engine is operated, a correction value is calculated by comparing a target MFB 50 and the calculated MFB 50 (S240), and main injection timing is corrected and controlled by using the calculated correction value (S250).

However, according to the method of controlling combustion of a diesel engine in the related art, it is required to directly mount a pressure sensor within a cylinder for control, and the pressure sensor is expensive and a factor necessary for control is supposed to be obtained by measuring pressure based on a crank angle.

Further, since expensive pressure sensors for measuring combustion pressure-installed in cylinders and wires for connecting the pressure sensors is required, manufacturing costs of a vehicle increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling combustion of a diesel engine where combustion timing can be controlled, even without installing a pressure sensor within a cylinder, by installing a sensor capable of measuring vibrations in an engine block and estimating a maximum pressure generation timing and an ignition start timing based on a signal acquired by the vibration sensor.

In an aspect of the present invention, a method of controlling combustion of a diesel engine, may include a vibration measuring step of measuring vibrations generated in the engine, a measurement region setting step of setting a range where an LPP (location of peak pressure) is predicted from vibration data measured in the vibration measuring step, a frequency transforming step of transforming a vibration signal set in the measurement region setting step to a frequency response function, a frequency integrating step of integrating the frequency response function transformed in the frequency transforming step, an LPP detecting step of selecting a location of a peak pressure from the frequency response function integrated in the frequency integrating step, an estimated value determining step of selecting an LPP offset and an SOC (start of combustion) offset by using the LPP detected in the LPP detecting step, an error determining step of determining an LPP value error and an SOC value error by comparing the estimated LPP value and the estimated SOC value determined in the estimated value determining step with a target LPP value and a target SOC value, and a combustion correcting step of correcting and controlling combustion by using the errors determined in the error determining step.

The combustion correcting step may include a fuel injection timing correcting step of correcting a fuel injection timing and controlling the fuel injection timing by applying the errors determined in the error determining step, and an injected fuel amount correcting step of correcting an amount of injected fuel.

In the vibration measuring step, vibrations input from a vibration sensor attached to the engine is measured.

In the frequency transforming step, a frequency region is transformed with reference to a band of 2 to 2.5 kHz.

In the frequency transforming step, the vibration signal is transformed to the frequency signal through Wavelet Transform.

The LPP offset and the SOC offset determined in the estimated value determining step are expressed in a map to be stored in an ECU.

According to the method of controlling combustion timing of a diesel engine according to the present invention having the above configuration, combustion of the diesel engine can be controlled through estimation of LPP and SOC, without installing high-priced pressure sensors in cylinders respectively, by installing only one vibration sensor capable of measuring vibrations in an engine block and measuring vibrations of the engine.

Further, since the vibration sensor is a non-contact type sensor as compared with the pressure sensors which have been installed in individual cylinders, the vibration sensor can be used permanently.

In addition, since a process of installing pressure sensors in cylinders respectively and wiring the pressure sensors is omitted, productivity improves.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 5A and 5B are graphs showing injection timings and measured vibrations in the method of controlling combustion of a diesel engine according to an exemplary embodiment of the present invention.

FIGS. 7A and 7B are graphs showing a wavelet transform process in the method of controlling combustion of a diesel engine according to an exemplary embodiment of the present invention.

Figure 1:
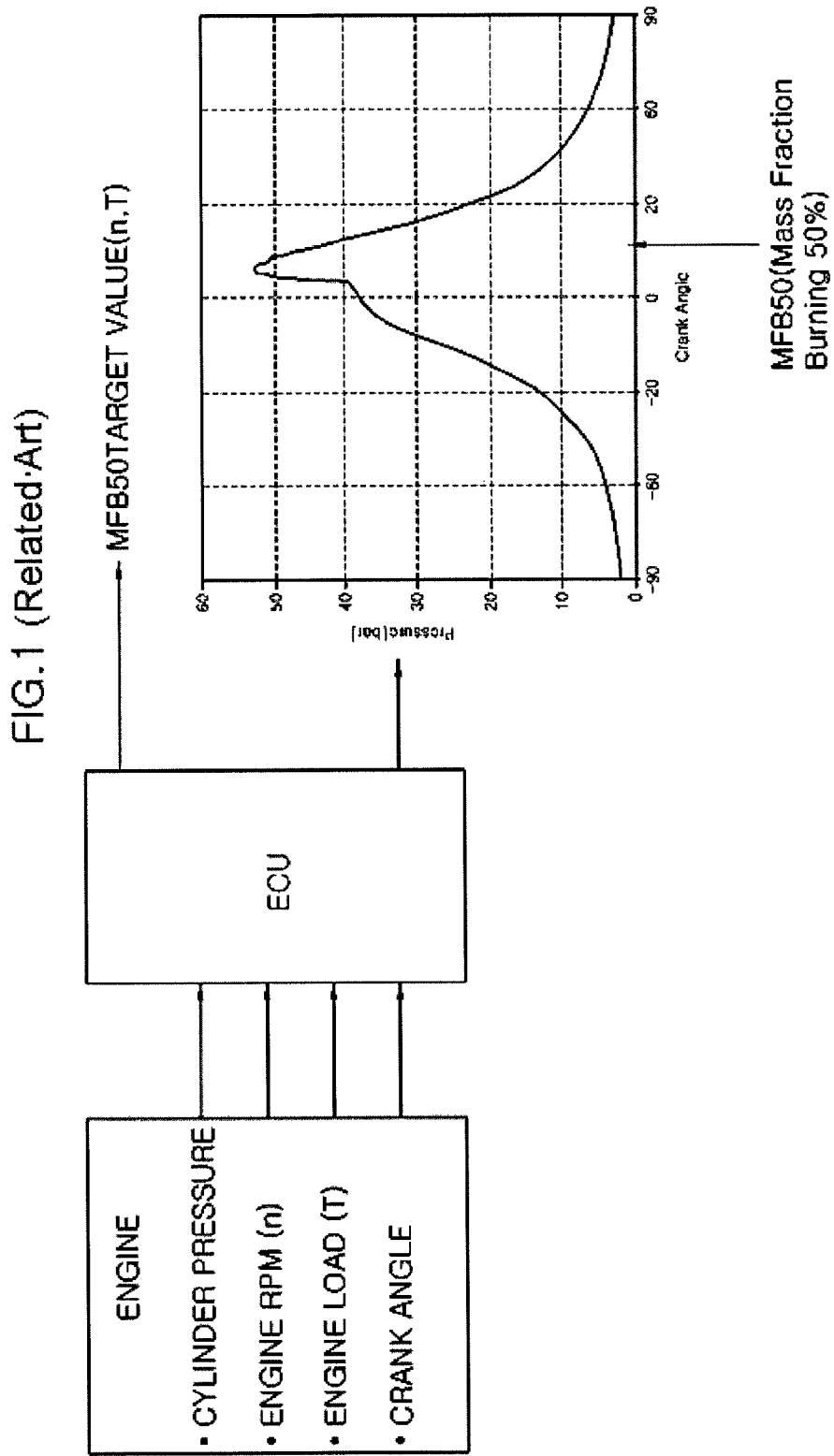
FIG. 1 is a block diagram showing a method of controlling combustion of a diesel engine according to the related art.
Figure 2:
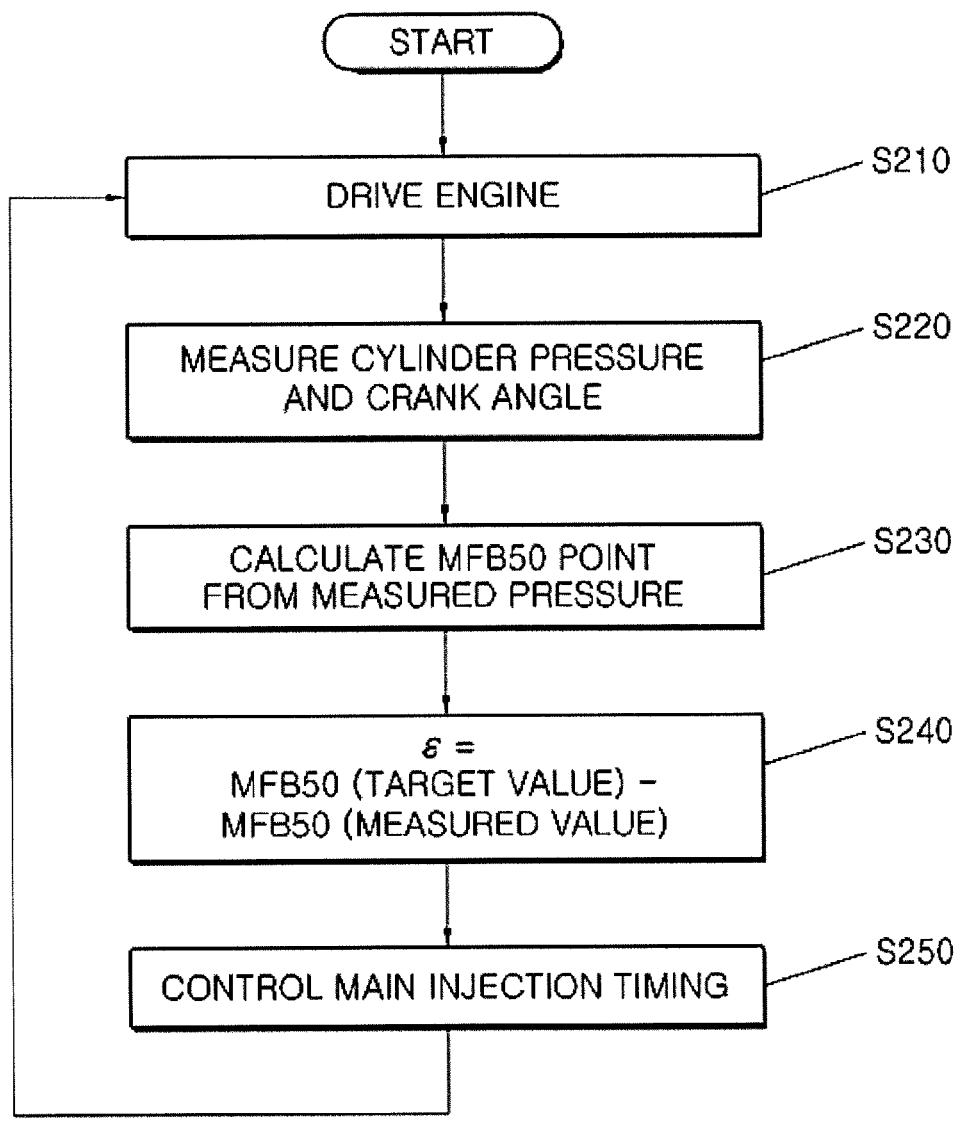
FIG. 2 is a flowchart showing the method of controlling combustion of a diesel engine according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a method of controlling combustion of a diesel engine according to an exemplary embodiment of the present invention will be described with reference to the accompanying drawings.

Figure 3:
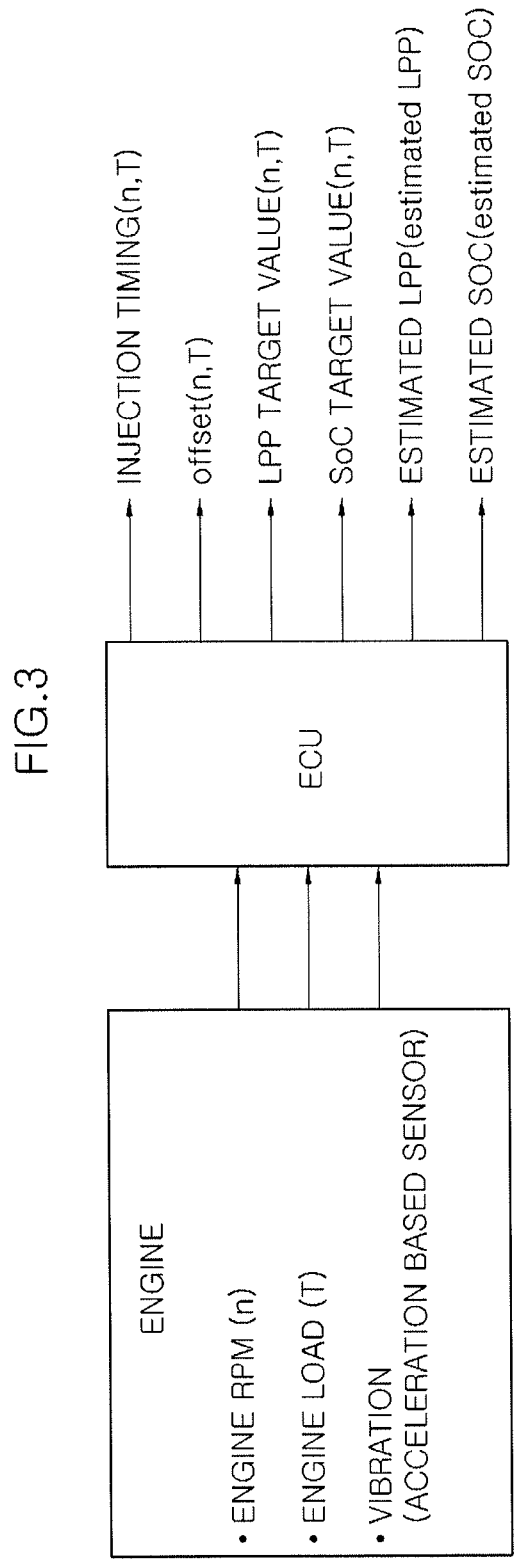
FIG. 3 is a block diagram showing a method of controlling combustion of a diesel engine according to an exemplary embodiment of the present invention.

FIG. 3 is a block diagram showing a method of controlling combustion of a diesel engine according to an exemplary embodiment of the present invention.

Figure 4:
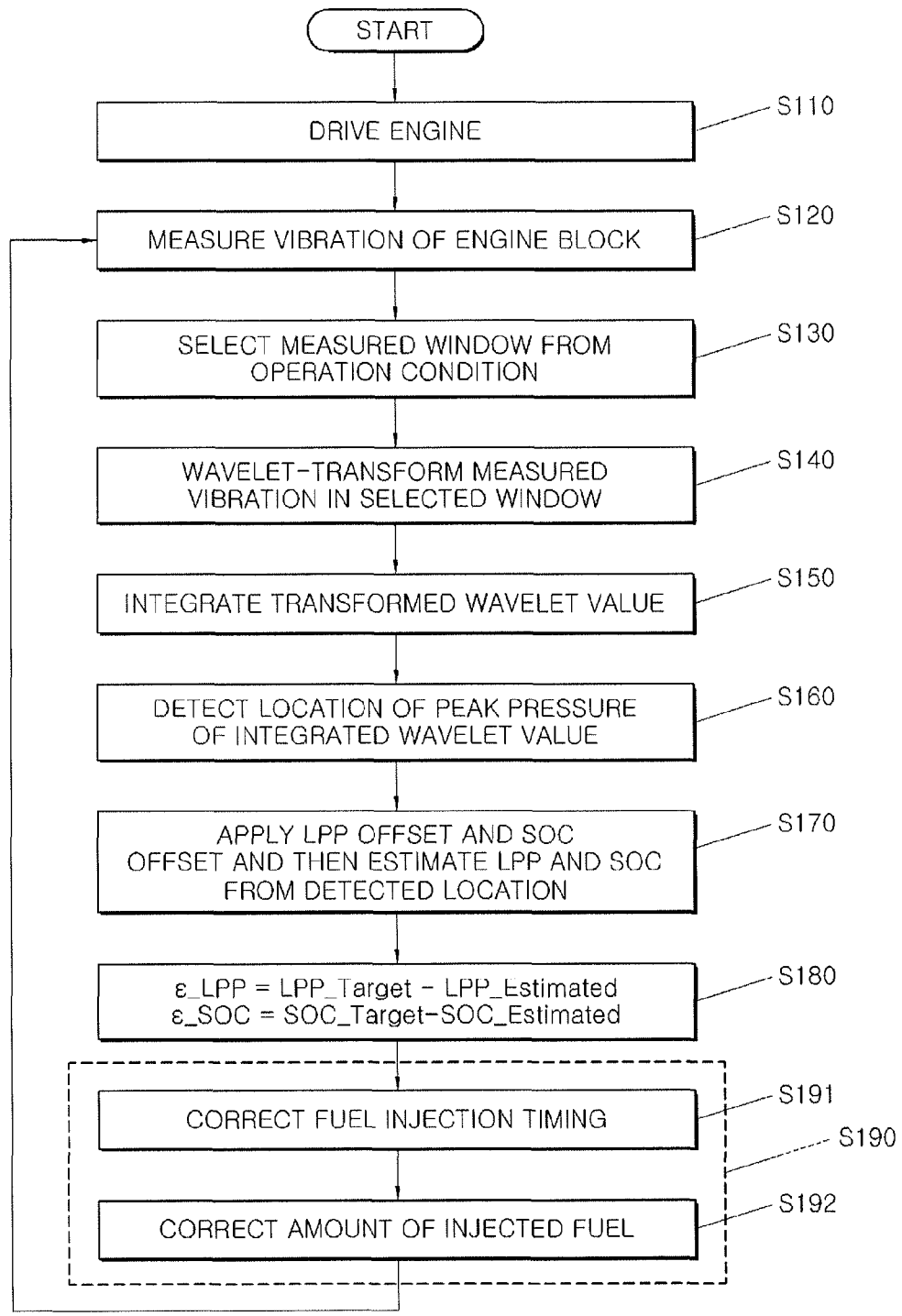
FIG. 4 is a flowchart showing the method of controlling combustion of a diesel engine according to an exemplary embodiment of the present invention.

FIG. 4 is a flowchart showing the method of controlling combustion of a diesel engine according to an exemplary embodiment of the present invention.

The method of controlling combustion of a diesel engine according to an exemplary embodiment of the present invention includes: a vibration measuring step S120 of measuring vibrations generated in the engine, a measurement region setting step S130 of setting a range where an LPP (location of peak pressure) is predicted from vibration data measured in the vibration measuring step S120, a frequency transforming step S140 of transforming a vibration signal set in the measurement region setting step S130 to a frequency response function, a frequency integrating step S150 of integrating the frequency response function transformed in the frequency transforming step S140, an LPP detecting step S160 of selecting a location of peak pressure from the frequency response function integrated in the frequency integrating step S150, an estimated value calculating step S170 of selecting an LPP offset and an SOC (start of combustion) offset by using the LPP detected in the LPP detecting step S160, an error calculating step S180 of calculating an LPP value error and an SOC value error by comparing the estimated LPP value and the estimated SOC value calculated in the estimated value calculating step S170 with a target LPP value and a target SOC value, and a combustion correcting step S190 of correcting and controlling combustion by using the values calculated in the error calculating step S180.

Figure 5A:
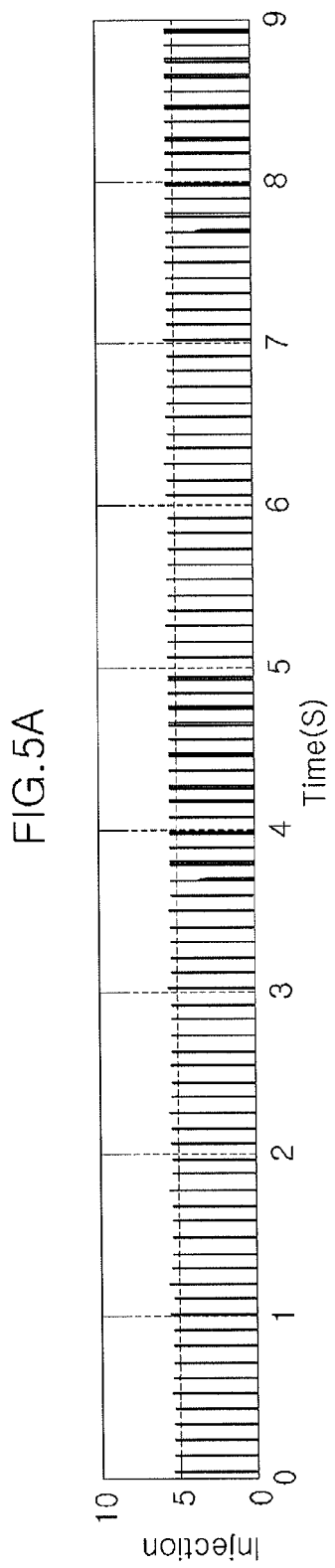

The vibration measuring step S120 is a process of measuring vibrations generated in the engine through a vibration sensor installed in an engine block after the engine is driven in step S110. The present invention does not directly measure a pressure of a combustion chamber, but measures a vibration generated due to combustion of the engine with the vibration sensor and transforms the measured vibration signal to a frequency to control the combustion of the engine. As shown in FIG. 5A, if a fuel is injected and burned at a predetermined cycle, vibrations of the engine block as shown in FIG. 5B are measured by the vibration sensor of the engine block with a delay due to transfer of a vibration force after the fuel is burned within the cylinder. During continuous combustions of the engine, the vibration sensor continues to measure vibrations of the engine to transfer the vibrations to an ECU.

In the measured region setting step S130, a measurement region for predicting a section where an LPP (location of peak pressure) is expected is set depending on operation conditions such as an engine RPM, a torque, etc. from a main injection timing through a preliminary test.

Figure 6:
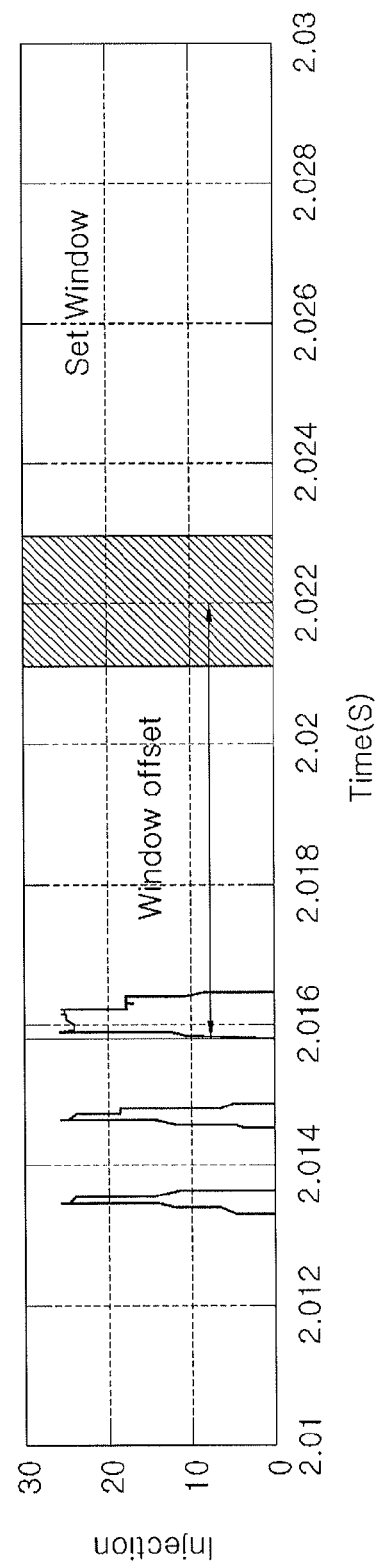
FIG. 6 is a graph showing a LPP generation predicted location in the method of controlling combustion of a diesel engine according to an exemplary embodiment of the present invention.

That is, as shown in FIG. 6, since an LPP appears after lapse of a predetermined window offset from a main injection, the measurement region corresponds to a certain region between before and after the predetermined window offset from the main injection.

The measurement region where an LPP is expected to occur after the main injection may be between 3 degrees before and after the LPP generation predicted location with respect to a crank angle.

The frequency transforming step S140 is a process of transforming a measured vibration signal to a frequency response function. Since the vibration signal acquired by the vibrations sensor cannot be used in controlling combustion of the engine, the measured vibration signal is transformed to a frequency response function which is a type of acceleration signal.

Figure 7A:
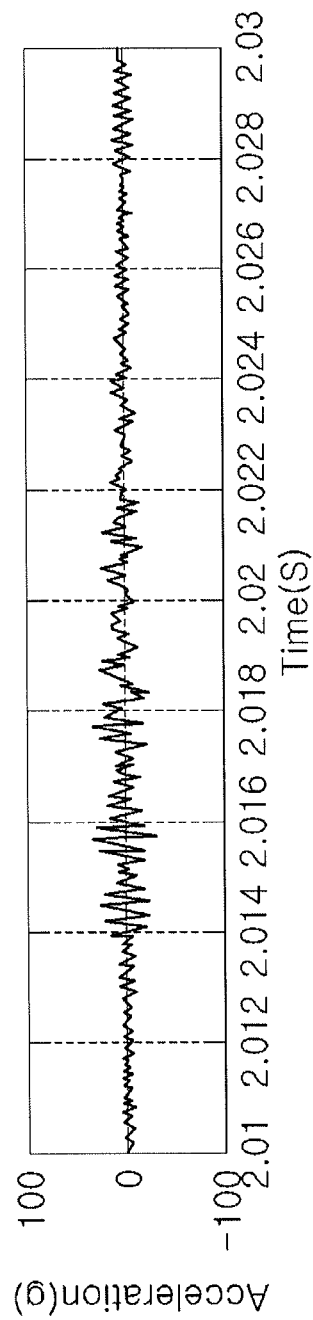

As shown in FIG. 7A, the vibration signal acquired by the vibration sensor is transformed to a frequency response function as shown in FIG. 7B through Meyer Wavelet Transform. Then, an equation applied is as follows.

$$W^f(b, a) = \int_{-\infty}^{+\infty} f(t) * \psi\left(\frac{t-b}{a}\right) dt$$

Herein, a denotes a compression coefficient corresponding to a frequency component, b denotes a time delay coefficient corresponding to a time component, and $W^f$ denotes a Wavelet Transform value.

Wavelet Transform is a mathematical function useful for digital signal processing and image compression wherein correlation is clarified by varying the magnitude and location of a waveform of one wavelength serving as a basic waveform, and is especially widely used in noise processing. Among them, the present invention transforms a vibration signal to a frequency signal by using only Meyer Wavelet Transform.

Then, the frequency region is transformed with reference to a band of 2 to 2.5 kHz which is determined to have a high interrelationship with combustion.

In the frequency integrating step S150, the transformed frequency response function is integrated. Then, the integrated section is integrated by using the following equation for the above-mentioned frequency section of 2 to 2.5 kHz.

$$IntegralCWT = \int_{2kHz}^{2.5kHz} W^f \, df$$

Figure 8:
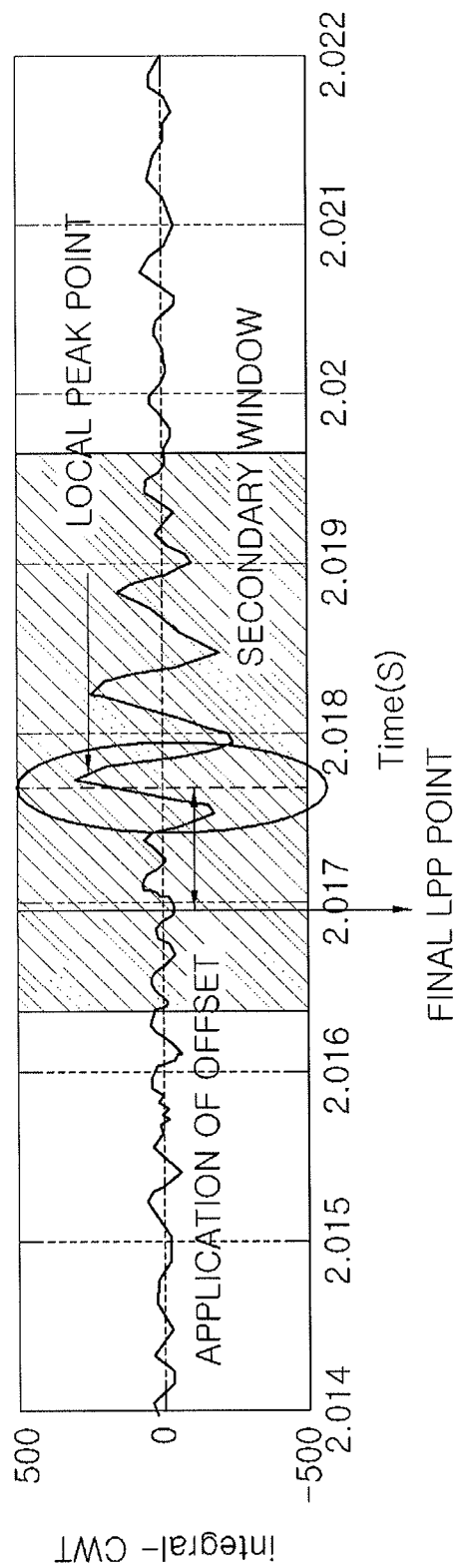
FIG. 8 is a graph showing a frequency integrating process in the method of controlling combustion of a diesel engine according to an exemplary embodiment of the present invention.

Since if the frequency response function is integrated, as shown in FIG. 8, an offset used for transferring vibrations from a final LPP time point is applied to a time point where the integrated value is maximal, the final LPP is detected a preset offset before the time point where the integrated value is maximal S160.

In the estimated value calculating step S170, an LPP offset and an SOC offset are selected by using the LPP detected in the LPP detecting step S160. That is, an offset between the actually measured LPP and SOC and the previously integrated CWT (continuous wave transform) realizes a map. The LPP offset and the SOC offset in the map are stored in an ECU.

In the error calculating step S180, the estimated LPP and SOC are compared with a target LPP and a target SOC to calculate differences or errors. An LPP error ($\epsilon$_LPP) corresponds to 'LPP_Target−LPP_Estimated', and an SOC error ($\epsilon$_SOC) corresponds to 'SOC_Target−SOC_Estimated'. Here, the target values for LPP and SOC are acquired from an operation condition.

Figure 9:
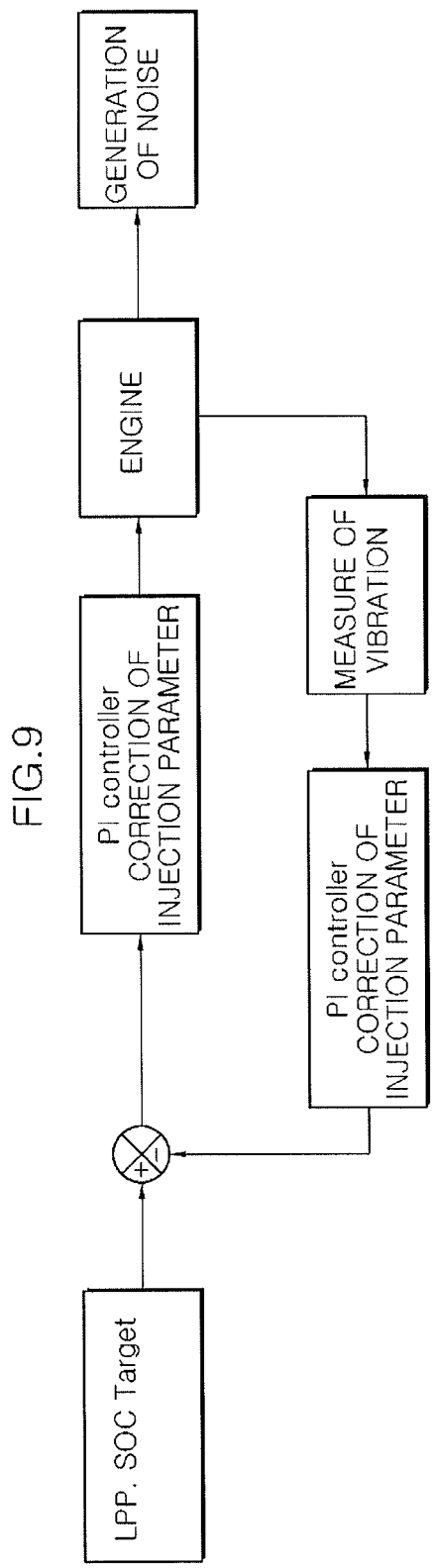
FIG. 9 is a block diagram showing a control principle in the method of controlling combustion of a diesel engine according to an exemplary embodiment of the present invention.

The combustion correcting step S190 is a step of controlling combustion by applying the errors calculated through the above-mentioned series of processes and correcting combustion of the engine. As shown in FIG. 9, a PI controller corrects a fuel injection timing of the engine including a main injection timing and a pilot injection timing by applying the previously set LPP error and SOC error (S191), and corrects an amount of injected fuel (S192).

After the combustion correcting step S190, the step returns to the vibration measuring step S120 again to measure vibrations, and a process of calculating errors and controlling a fuel injection timing and an amount of injected fuel of the engine by using the values corrected again is repeated via a series of steps.

The foregoing descriptions of specific exemplary embodiments of the present invention have been presented, for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling combustion of a diesel engine, comprising:
    a vibration measuring step of measuring vibrations generated in the engine;
    a measurement region setting step of setting a measurement region for predicting a section where an LPP (location of peak pressure) is expected to be, wherein the measurement region is set to be from about 3 degrees before an LPP generation predicted location that is predicted from vibration data measured in the vibration measuring step to about 3 degrees after the LPP generation predicted location with respect to a crank angle;
    a frequency transforming step of transforming a vibration signal set in the measurement region setting step to a frequency response function;
    a frequency integrating step of integrating the frequency response function transformed in the frequency transforming step;
    an LPP detecting step of selecting a location of a peak pressure from the frequency response function integrated in the frequency integrating step;
    an estimated value determining step of selecting an LPP offset and an SOC (start of combustion) offset by using the LPP detected in the LPP detecting step;
    an error determining step of determining an LPP value error and an SOC value error by comparing the estimated LPP value and the estimated SOC value determined in the estimated value determining step with a target LPP value and a target SOC value; and
    a combustion correcting step of correcting and controlling combustion by using the errors determined in the error determining step.

2. The method as defined in claim 1, wherein the combustion correcting step includes:
    a fuel injection timing correcting step of correcting a fuel injection timing and controlling the fuel injection timing by applying the errors determined in the error determining step; and
    an injected fuel amount correcting step of correcting an amount of injected fuel.

3. The method as defined in claim 1, wherein in the vibration measuring step, vibrations input from a vibration sensor attached to the engine is measured.

4. The method as defined in claim 1, wherein in the frequency transforming step, a frequency region is transformed with reference to a band of 2 to 2.5 kHz.

5. The method as defined in claim 1, wherein in the frequency transforming step, the vibration signal is transformed to the frequency signal through Wavelet Transform.

6. The method as defined in claim 1, wherein the LPP offset and the SOC offset determined in the estimated value determining step are expressed in a map to be stored in an engine control unit (ECU).

* * * * *